(12) United States Patent
Mohammad et al.

(10) Patent No.: US 10,028,871 B2
(45) Date of Patent: Jul. 24, 2018

(54) METHOD AND DEVICE ASSISTING WITH THE ELECTRIC PROPULSION OF A ROLLING SYSTEM, WHEELCHAIR KIT COMPRISING SUCH A DEVICE AND WHEELCHAIR EQUIPPED WITH SUCH A DEVICE

(71) Applicants: CENTRE NATIONAL DE LA RECHERCHE SCIENTIFIQUE, Paris (FR); UNIVERSITE DE VALENCIENNES ET DU HAINAUT CAMBRESIS, Valenciennes (FR)

(72) Inventors: Sami Mohammad, Valenciennes (FR); Thierry-Marie Guerra, Valenciennes (FR); Philippe Pudlo, Valenciennes (FR)

(73) Assignees: CENTRE NATIONAL DE LA RECHERCHE SCIENTIFIQUE (CNRS), Paris (FR); Université de Valenciennes et du Hainaut Cambresis, Valenciennes (FR)

( * ) Notice: Subject to any disclaimer, the term of this patent is extended or adjusted under 35 U.S.C. 154(b) by 0 days.

(21) Appl. No.: 15/310,073

(22) PCT Filed: May 7, 2015

(86) PCT No.: PCT/EP2015/060009
§ 371 (c)(1),
(2) Date: Nov. 9, 2016

(87) PCT Pub. No.: WO2015/173094
PCT Pub. Date: Nov. 19, 2015

(65) Prior Publication Data
US 2017/0151109 A1   Jun. 1, 2017

(30) Foreign Application Priority Data
May 12, 2014  (FR) ...................................... 14 54201

(51) Int. Cl.
*A61G 5/04* (2013.01)
*B60L 11/18* (2006.01)
*B60K 7/00* (2006.01)

(52) U.S. Cl.
CPC ............ *A61G 5/048* (2016.11); *B60K 7/0007* (2013.01); *B60L 11/18* (2013.01)

(58) Field of Classification Search
CPC ........ A61G 5/048; B60K 7/0007; B60L 11/18
(Continued)

(56) References Cited

U.S. PATENT DOCUMENTS 4,387,325 A * 6/1983 Klimo .................... A61G 5/045
  180/907
5,270,624 A * 12/1993 Lautzenhiser ...... B60L 11/1805
  318/139
(Continued)

FOREIGN PATENT DOCUMENTS

EP  2 206 640 A2  7/2010
WO  2013/006818 A2  1/2013

OTHER PUBLICATIONS

Takashi Miyazawa et al., "A Power-Assisted Wheelchair Taking Running Environment into Account," The 29th Annual Conference on the IEEE Industrial Electronics Society, Nov. 2003, vol. 2, pp. 1343-1348, XP010691084.

*Primary Examiner* — Tyler J Lee
(74) *Attorney, Agent, or Firm* — Osha Liang LLP (57) ABSTRACT

A method for electrically assisting with the propulsion of a rolling system comprising a driving wheel driven by an electric motor, the torque applied by the motor being a function of a propulsion torque transmitted by a user to the driving wheel, wherein the method comprises: a preliminary step of storing in memory an unknown input model representing the weighted system, which is a function of the geometry and of the mass of the weighted system, and
(Continued)

having as output data the rotational speed of the driving wheel; a step of estimating unknown input being the total torque applied to the wheel, influencing the rotational speed, the total torque being estimated from the rotational speed by calculating the inverse model; the propulsion torque transmitted by the user being deduced from the total torque estimated on the basis of the other known torques that make up the total torque.

14 Claims, 3 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 5,497,056 A * | 3/1996 | Kurland | .................... | B60L 7/10 |
| | | | | 180/907 |
| 5,818,189 A * | 10/1998 | Uchiyama | .............. | A61G 5/045 |
| | | | | 180/907 |
| 6,003,627 A * | 12/1999 | Ishida | .................... | A61G 5/045 |
| | | | | 180/206.2 |
| 6,807,465 B2 * | 10/2004 | Ulrich | .................... | A61G 5/045 |
| | | | | 180/65.1 |
| 7,204,328 B2 * | 4/2007 | LoPresti | .............. | G01S 17/936 |
| | | | | 180/19.3 |

* cited by examiner

METHOD AND DEVICE ASSISTING WITH THE ELECTRIC PROPULSION OF A ROLLING SYSTEM, WHEELCHAIR KIT COMPRISING SUCH A DEVICE AND WHEELCHAIR EQUIPPED WITH SUCH A DEVICE

CROSS-REFERENCE TO RELATED APPLICATIONS

This application is a National Stage of International patent application PCT/EP2015/060009, filed on May 7, 2015, which claims priority to foreign French patent application No. FR 1454201, filed on May 12, 2014, the disclosures of which are incorporated by reference in their entirety.

FIELD OF THE INVENTION

The present invention relates to a method and a device for assisting with the electric propulsion of a rolling system. It also relates to a wheelchair kit comprising such a device and to a wheelchair equipped with such a device.

BACKGROUND

There are various types of wheelchair on the market, from the simplest manual version to the most sophisticated all-electric version. Faced with the difficulties encountered in daily life, many individuals of reduced mobility are abandoning manual wheelchairs because these wheelchairs require significant physical effort on the part of the users and are not always easy to maneuver, ultimately limiting the independence of the individuals concerned. The latter then have to choose between all of the chairs available on the market, notably according to their disability, their physical capacity and their financial situation.

One solution for allowing these individuals to regain a greater degree of independence is to use an all-electric chair equipped with a control member. Using this control member, the user can activate the chair in all directions, the chair being propelled by means of an electric motor, hand rims coupled to the wheels incidentally still being provided in order to allow manual operation notably if the electric propulsion is unavailable. Another, less expensive, solution is to equip a conventional wheelchair with an additional motorization kit. These motorization kits include kits that electrically assist with propulsion.

Motorization kits that assist with electric propulsion use a sensor on each hand rim to detect the driving movement applied by the user to the hand rim. This sensor may be a simple switch detecting two states, a forward movement and a backward movement. It may also be a switch of the Hall effect type, which measures the position of the hand rim with respect to the wheel, the hand rim having a few degrees of freedom relative to the wheel. The advantage with this type of sensor is that it makes it possible to measure the intensity of the movement applied to the hand rim, this making it possible to apply a propulsion speed that is a function of this intensity. The information delivered by the sensor is transmitted via a rotary commutator to an electronic control board which manages the voltage applied to each wheel motor.

Propulsion assistance may also be commanded by a third party pushing the wheelchair, in order to reduce the pushing effort that the latter has to supply. The command is a device suited to the motor control electronic board or boards.

This solution of electrically assisting propulsion therefore requires sensors on each hand rim, possibly a control member for a third party and means of transmitting the information collected to the control electronics, particularly a rotary commutator on each wheel. The infrastructure required for picking up the instructions commanding propulsion, notably via the hand rim, is therefore complex, bulky and expensive.

SUMMARY OF THE INVENTION

It is a notable object of the invention to simplify this infrastructure. To this end, one subject of the invention is a method for electrically assisting with the propulsion of a rolling system comprising at least one driving wheel driven by an electric motor, the torque applied by said motor being a function of a propulsion torque transmitted by at least one user to said driving wheel, said method comprising:

a preliminary step of storing in memory an unknown input model representing said weighted system and having as output data the rotational speed of said driving wheel;

a step of estimating said unknown input, the unknown input to be estimated being the total torque applied to said wheel, influencing said rotational speed, said total torque being estimated from said rotational speed by calculating the inverse model;

the propulsion torque transmitted by the user being deduced from said total torque estimated on the basis of the other known torques that make up said total torque.

The motor torque is, for example, slaved to a reference, possibly variable, representative of the value of the propulsion torque transmitted by the user.

Another subject of the invention is a device for electrically assisting with propulsion able to equip a rolling system comprising at least one driving wheel, said device comprising at least:

an electric motor able to be fixed to said driving wheel to drive the rotation thereof;

a sensor able to measure the rotational speed of said driving wheel;

processing means:
receiving as input the measurement of said rotational speed;
storing in memory an unknown input model representing said weighted system, and having as output data said rotational speed, the unknown input being the total torque applied to said wheel, influencing said rotational speed;
transmitting as output a control reference commanding the motor torque to be applied to said wheel, said reference being representative of the value of the propulsion torque transmitted by at least one user to said wheel, said processing means estimating said total torque by estimating the unknown input representing said total torque from said rotational speed by calculating the inverse model, the torque applied by the user being deduced from said total torque on the basis of the other known torques that make up the estimated total torque.

With the motor being, for example, of the brushless type, said sensor is, for example, integrated into the motor, the rotational speed of said wheel being measured from the rotor speed of said motor. The motor torque is, for example, slaved to said reference.

Another subject of the invention is a kit for electrically assisting with the propulsion of a wheelchair comprising two driving wheels, characterized in that it comprises at least:

two electric motors, each motor being able to be fixed to a driving wheel to drive the rotation thereof;

two sensors, each one being able to measure the rotational speed of one driving wheel;

for each driving wheel, processing means:

receiving as input the measurement of said rotational speed;

storing in memory an unknown input model representing said weighted system, and having as output data the rotational speed of said wheel, the unknown input being the total torque applied to said wheel, influencing said rotational speed;

transmitting as output a control reference commanding the motor torque to be applied to said wheel, said reference being possibly variable and representative of the value of the propulsion torque transmitted by at least one user to said wheel, said processing means estimating said total torque by estimating the unknown input representing said total torque from said rotational speed by calculating the inverse model, the torque applied by the user being deduced from said total torque on the basis of the other known torques that make up the estimated total torque.

With said motors being for example of the brushless type, each sensor is, for example, integrated into one of said motors, the rotational speed of a wheel being measured from the rotor speed of the motor.

The processing means are, for example, installed on one or more control boards, able to be fixed to the chassis of said chair, a two-way link connecting said board to each motor in order to transmit said reference to each motor and to receive said rotational speed measurement.

For each wheel, the propulsion torque is, for example, transmitted via a hand rim coupled to the wheel. For each wheel, the propulsion torque may also be transmitted by a third party pushing said chair. For each wheel, the propulsion torque may also be transmitted by foot power, namely with the user using one or both of his legs to propel the wheelchair.

Another subject of the invention is an electric wheelchair, comprising a device as described hereinabove, said chair comprising two driving wheels, an electric motor being fixed to each wheel in order to drive the rotation thereof, and for each driving wheel, the processing means:

receiving as input a measurement of the rotational speed of said wheel;

storing in memory a model considering an unknown input representing said weighted system, and having as output data the rotational speed of said wheel, the unknown input being the total torque applied to said wheel, influencing said rotational speed;

transmitting as output a control reference commanding the motor torque to be applied to said wheel, said reference being representative of the value of the propulsion torque transmitted by at least one user to said wheel, said processing means estimating said total torque by estimating the unknown input representing said total torque, the torque applied by the user being deduced from said total torque on the basis of the other known torques that make up the estimated total torque, said processing means estimating said total torque from said rotational speed by calculating the inverse model.

The processing means are, for example, installed on one and the same control board, fixed to the chassis of said chair, a two-way link connecting said board to each motor in order to transmit said reference to each motor and to receive said rotational speed measurement.

For each wheel, the propulsion torque is, for example, transmitted via a hand rim coupled to the wheel, or by a third party pushing the chair.

BRIEF DESCRIPTION OF THE DRAWINGS

Further features and advantages will become apparent through the attached drawings which depict.

DETAILED DESCRIPTION

Figure 1:
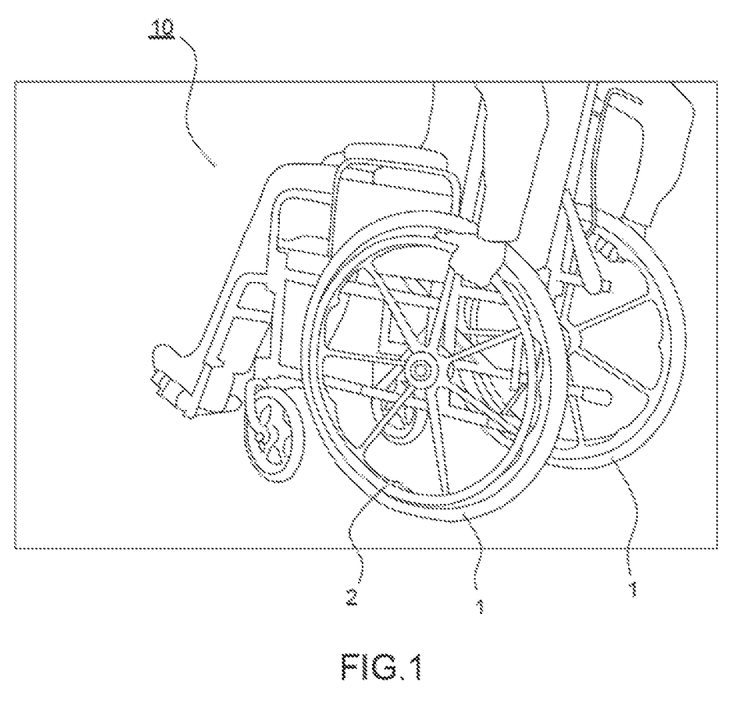
FIG. 1: an individual moving around in a manually propelled wheelchair.

FIG. 1 depicts an individual moving around in a manual wheelchair. The individual makes the chair move by applying circular thrust forward or backward on the hand rim 2 coupled to each wheel 1, causing the wheels to turn. This way of moving around demands physical effort that users find tiring or even impossible.

A device for electrically assisting with propulsion makes it possible to reduce or eliminate this physical effort. Such a device comprises two electric motors, one motor being coupled to each wheel in order to drive the rotation thereof. The motors used are, for example, of the brushless motor type. The motor torque delivered by a motor is a function of the driving movement applied to the hand rim 2. For this reason, a sensor is assigned to each hand rim to detect the presence and intensity of this movement. If a forward driving movement is detected on each hand rim, the motors propel the chair forward. If the sensors detect the intensity of the movement, the speed of propulsion is higher or lower according to this intensity. In order to steer to the left or to the right, one or other of the hand rims is turned. In the case of the use of a switching sensor, of on/off type, the command information is binary. A forward or backward movement on the hand rim is detected. In the case of the use of a Hall effect sensor, the hand rim 2 is coupled to a wheel 1 with a circular degree of freedom of a few degrees, for example around ten degrees. In this case, the Hall effect sensor is able to detect an angular discrepancy between the wheel and the hand rim that is a function of the intensity of the movement applied by the user to the hand rim. The Hall effect sensor is then able to deliver a signal that is a function of this intensity in order to command the wheel driving motor, the motor torque delivered by the motor being a function of this intensity.

Figure 2A:
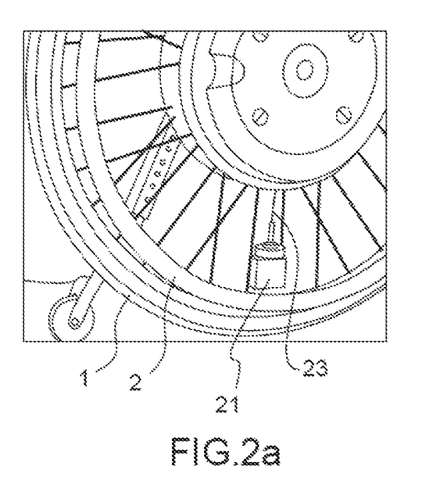
FIGS. 2a and 2b: examples of sensors used for devices for electrically assisting with propulsion according to the prior art.
Figure 2B:
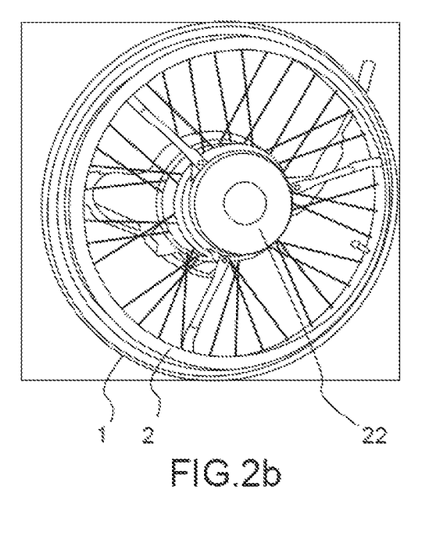

FIGS. 2a and 2b show two examples of sensors detecting the movement imparted to a hand rim, these sensors being Hall effect sensors. In the example of FIG. 2, the sensor 21 is fixed to the spokes of the wheel 1, near the wheel rim. The information regarding the angular discrepancy between the hand rim and the wheel is transmitted by a wire 23 to an electronic control board via a rotary commutator which has not been depicted. In the example of FIG. 2b, the sensor 22 is fixed in the region of the hub of the wheel. These sensors 21, 22, the associated wiring and the rotary commutators make assembly more complex and increase the cost of the chair. In particular, in the case of a kit providing electrical assistance with propulsion, these components also make mounting the kit on a wheelchair and removing it therefrom more complicated.

Figure 3:
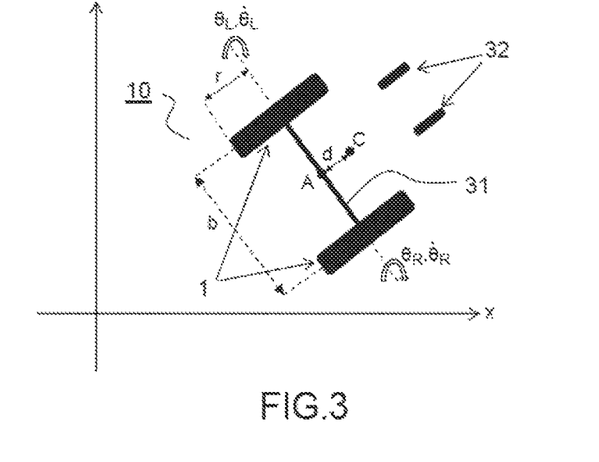
FIG. 3: an illustration of the operating principle of the invention.

FIG. 3 illustrates the principle behind a device providing electrical assistance with propulsion according to the invention, in a view from above of the constituent elements of a model of wheelchair laden with an individual. According to the invention, the physical sensors are replaced by virtual sensors. In other words, the detection of the propulsion torque applied by the user to a hand rim is no longer performed by a physical sensor, rather this propulsion torque is determined using a method based on the principle of estimating the unknown inputs of the system consisting of the wheelchair. The weighted wheelchair can be modeled because all the parameters needed for establishing the model are known.

Using the model, a method of estimating the status of the model subjected to the influence of unknown inputs is applied, where the unknown inputs are the torques exerted on the wheels by the user via the hand rims, these torques being exerted on the hand rims. From parameters of the model and knowledge of the output data, in this instance the rotational speed of the wheels, it is possible to work back to the torques exerted by the user, by calculating the inverse model. This method has the advantage of being simple to implement. Of course, other methods may be used.

With reference to FIG. 3, the parameters of the model are given hereinafter, considering the chair equipped with an electric motorization device, to assist with propulsion, as described previously, but without the physical sensors and the associated infrastructure:

m, the mass of the weighted chair, i.e. of the chair laden with the user;
r, the radius of the driving wheels 1;
K, the coefficient of friction;
d, the distance between the center of gravity C and the vertical plane passing through the axis of the driving wheels 1;
b, the distance between the driving wheels 1;
$I_A$, the moment of inertia of the chair with respect to the vertical axis passing through the point A, the midpoint of the axis of the two driving wheels 1;
$I_0$, the moment of inertia of a driving wheel 1.

The steering wheels 32 are not involved in the model as such and are taken into consideration only in the mass of the weighted chair.

The mass m of the assembly consisting of the wheelchair and of the individual is not known precisely unless a specific measurement is taken for each user. Likewise, the exact position of the center of gravity C is not known. However, to establish the model, a standard mass m is considered for the individual and a standard distance d is considered for the distance from the center of gravity to the axis 31 of the wheels. This approach gives precision which in practice proves sufficient.

$M_R$, $M_L$ are, respectively, the torque exerted on the right-hand wheel and the torque exerted on the left-hand wheel. These torques are obtained by a method of estimating the unknown inputs of a model, the model being defined from the parameters defined hereinabove. For each wheel, the torque $M_R$, $M_L$ is the sum of the electric propulsion torque produced by the motor, of the manual or mechanical propulsion torque exerted by the user and of a gravity torque that is also exerted on the wheel. The torque produced by the electric motor and the torque produced by gravitation are known, so the propulsion torque exerted by the user can be deduced as shown by the equations which follow.

There may be other known torques that make up the total torque exerted on the wheels, for example the torque imposed by the strength of the wind or even the friction torque of the wheels on the road surface. The torque of gravity on a slope, which also contributes to the total torque, can be calculated by knowing the weight of the weighted chair and the angle of inclination of the slope on which the chair is moving. This can be measured using an accelerometer.

In any case, the total torque exerted on the chair is estimated by knowing only the geometry of the chair and the mass of the weighted chair, and by knowing the rotational speed of the wheels, the geometry of the chair notably being defined by the above parameters of the model.

The equations of motion for the chair can be obtained by applying the conventional laws of mechanics, $\theta_R$, $\theta_L$ respectively being the angles of rotation of the right-hand wheel and of the left-hand wheel about the axis 21.

$$\alpha \ddot{\theta}_R + \beta \ddot{\theta}_L = M_R - K\dot{\theta}_R$$

$$\beta \ddot{\theta}_R + \alpha \ddot{\theta}_L = M_L - K\dot{\theta}_L$$

$$\alpha = \frac{mr^2}{4} + \frac{(I_A + md^2)r^2}{b^2} + I_0$$

$$\beta = \frac{mr^2}{4} - \frac{(I_A + md^2)r^2}{b^2}$$

These equations can be rewritten in a different form, in order to extract therefrom the angular accelerations of the wheels:

$$\ddot{\theta}_R = \frac{\alpha}{\alpha^2 - \beta^2}\left(M_R - K\dot{\theta}_R - \frac{\beta}{\alpha}M_L + \frac{\beta}{\alpha}K\dot{\theta}_L\right)$$

$$\ddot{\theta}_L = \frac{\alpha}{\alpha^2 - \beta^2}\left(M_L - K\dot{\theta}_L - \frac{\beta}{\alpha}M_R + \frac{\beta}{\alpha}K\dot{\theta}_R\right)$$

it being possible for the coefficient K to be estimated from test-bench measurements for example, its precision not being essential given the robustness of the estimation method used.

And finally in state form, with the state vector $$x = \begin{bmatrix} \dot{\theta}_R \\ \dot{\theta}_L \end{bmatrix}$$

and the input vector $$u = \begin{bmatrix} M_R \\ M_L \end{bmatrix}$$

and the two outputs which are the states $$y = \begin{bmatrix} \dot{\theta}_R \\ \dot{\theta}_L \end{bmatrix}:$$

$$\dot{x} = Ax + Bu$$

$$y = Cx$$

$$A = \frac{K}{\alpha^2 - \beta^2} \begin{bmatrix} -\alpha & \beta \\ \beta & -\alpha \end{bmatrix}, B = \frac{1}{\alpha^2 - \beta^2} \begin{bmatrix} \alpha & -\beta \\ -\beta & \alpha \end{bmatrix}, C = \begin{bmatrix} 1 & 0 \\ 0 & 1 \end{bmatrix}$$

In the ideal case without measurement noise and in which the matrix B can be inverted which, in general, it can be, it is easy to find the observer of the input u:

$$u = B^{-1}(\dot{x} - Ax)$$

That means, that from the angular velocities of the wheels it is possible to calculate the torque $M_R$, $M_L$ exerted on each wheel.

This torque is, moreover, the sum of all the torques present about the axis of the wheel:

$$M_R = M_{RP} + M_{RM} + M_{RG}$$

$M_{RP}$ is the manual propulsion torque exerted on the right-hand wheel by the user, this torque being the data being looked for;

$M_{RM}$ is the torque exerted by the right-hand motor, this torque being known;

$M_{RG}$ is the torque exerted by gravity on the right-hand wheel, this torque being likewise known.

From that then the propulsion torque $M_{RP}$ on the right-hand wheel, and exerted by the user can be deduced:

$$M_{RP} = M_R - M_{RM} - M_{RG}.$$

The propulsion torque $M_{LP}$ on the left-hand wheel, exerted by the user, is likewise deduced:

$$M_{LP} = M_L - M_{LM} - M_{LG}.$$

$M_{LM}$ is the torque exerted by the left-hand motor and $M_{LG}$ is the torque exerted by gravity on the left-hand wheel, these torques being known.

Thus, from knowing the angular velocities of the right-hand and left-hand wheels, $\dot{\theta}_R$ and $\dot{\theta}_L$, it is possible to determine the propulsion torques, or drive torques, exerted by the user on the right-hand and left-hand wheels.

Knowledge of the velocities $\dot{\theta}_R$ and $\dot{\theta}_L$ can be had with ease without the need for special sensors. Specifically, the rotational speed of the wheels can be obtained simply from rotor position sensors incorporated into the brushless motors used. These sensors are, for example, Hall effect sensors or sensors of the incremental encoder type. Knowledge of the rotor speed for each motor makes it possible to determine the speed of the wheel to which it is fitted.

Advantageously, the invention can also be used to determine the propulsion exerted by a third party, this propulsion being, for example, exerted on the handles at the rear of the chair. Specifically, this propulsion ultimately results in a propulsion torque exerted on the wheels, just like a propulsion exerted via the hand rims.

From the estimate of the propulsion torque exerted by the user on the hand rim and/or by a third party, it is possible to regulate the speed at which the wheels are turned by the motors. The reference value for the rotational speed of the right-hand wheel is dependent on the propulsion torque exerted on the right-hand wheel and the reference value for the rotational speed of the left-hand wheel is dependent on the propulsion torque exerted on the left-hand wheel, these propulsion torques being estimated by the method described hereinabove from measurements of the rotational speeds of the wheels. The reference is possibly variable. These measurements are made using sensors integrated into the brushless motors and therefore without the need for additional components. The speed references may be transmitted to the motors in the form of electrical voltages. A suitable interface allows control over the voltage supplied to the motor on the basis of this reference, the rotational speed being a direct function of this supply voltage. In another control mode, using pulse width modulation (PWM), a microcontroller delivers a square wave signal the period of which is a function of the reference.

Figure 4:
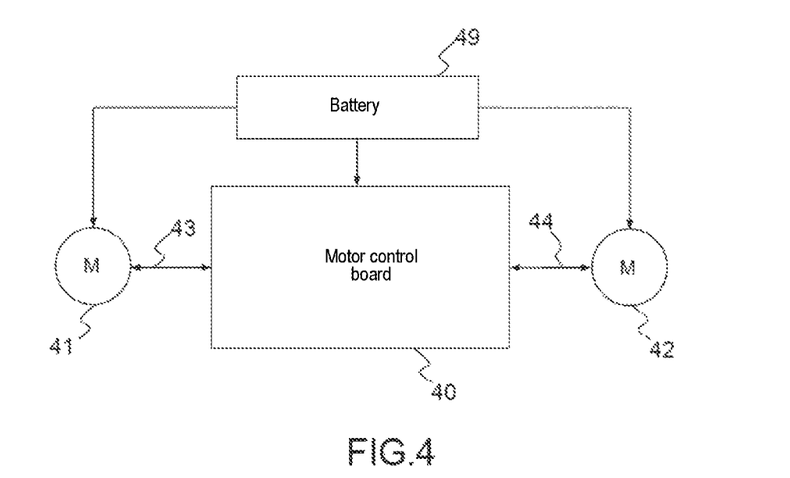
FIG. 4: a depiction of the components of a device according to the invention.

FIG. 4 shows the components of a device providing electrical assistance with propulsion according to the invention. This device comprises at least one motor control board 40 and two motors 41, 42. Each motor is able to be mechanically coupled to a wheel 1 of a wheelchair. The device also comprises a battery 49 supplying the electrical energy to the motors and powering the board 40. The motors are, for example, of the brushless type. Conventionally, an inverter, not depicted, is coupled to each motor to convert the DC voltage supplied by the battery into an AC voltage. This inverter may be positioned in the region of the motors or in the region of the battery support.

This device may on its own constitute a kit providing electrical assistance with propulsion or may form part of such a kit. This device may be used directly to create an electric wheelchair, without being in the form of a kit.

The control board 40 controlling the motors may be replaced by two control boards, one board being assigned to each motor 41, 42. The motors comprise means of attachment to the wheels, these means of attachment being conventional and known from elsewhere.

The control board 40 may be installed on a fixed point of the chair, for example on a support or in a casing fixed to the chassis, underneath the seat, and preferably at a point that is not too far removed from the motors. A two-way link 43 to a first motor 41 and a two-way link 44 to the second motor 42 allow speed information from the motor sensors to be transmitted to the board 40 and rotational speed references to be transmitted from the board 40. These links are, for example, wired connections. They may also be of the wireless type, provided that suitable transmission and reception means are provided on the board and on the motors.

The control board 40 comprises processing means that calculate the propulsion torques $M_{RP}$, $M_{LP}$ exerted by the user via the hand rim and/or by a third party, from knowledge of the angular velocities $\dot{\theta}_R$, $\dot{\theta}_L$ of the wheels. The values of these velocities are transmitted from the motors. The processing means in a first phase calculate the torque $M_R$, $M_L$ exerted on each wheel. In a second phase, the processing means calculate the value of the propulsion torque $M_{RP}$, $M_{LP}$ exerted on each wheel, from knowledge of the motor torque and of the gravity torque applied to the wheel and known from elsewhere. In order to perform these calculations, the processing means incorporate in their memory the model of the chair allowing these calculations, particularly the computation means that store in memory the parameters of the model.

For each wheel, a reference value proportional to the value of the torque $M_{RP}$, $M_{LP}$ is transmitted to the relevant drive motor 41, 42, for example in the form of a voltage. Two speed feedback control loops are, for example, created, one for the right-hand wheel and the other for the left-hand wheel, with, as input reference, the propulsion torque exerted on the wheel.

It is possible to provide other means of exploiting the estimated propulsion torques $M_{RP}$, $M_{LP}$.

The estimate of the total torque applied to each driving wheel can be made from each propulsion pulse applied by the user to the associated hand rim or at a given fixed rate, for example of a few milliseconds.

FIG. 4 shows the simplicity of a device providing electrical assistance with propulsion according to the invention. In particular, such a device does not require physical sensors and their associated infrastructures. The manual propulsion torque exerted on each wheel by the user and/or by a third party, is simply calculated from the rotational speed of the wheel, which speed is also simple to obtain, without additional hardware.

The invention has been described in the case of assistance with electric propulsion of a wheelchair. It may be applied to other rolling systems, comprising at least one driving wheel and of which the propulsion of electrical origin is commanded by a propulsion torque, for example created manually, transmitted to this driving wheel. In particular, the invention may be applied to the electrical assistance of propulsion on bicycles or other means of locomotion of the same type.

The invention claimed is:

1. A method for electrically assisting with a propulsion of a rolling system comprising at least one driving wheel driven by an electric motor, a torque applied by said motor being a function of a propulsion torque transmitted by at least one user to said driving wheel, wherein said method comprises:
   a preliminary step of storing in memory an unknown input model representing a weighted system, which is a function of a geometry and of a mass of said weighted system, and having as output data a rotational speed of said driving wheel;
   a step of estimating said unknown input, the unknown input to be estimated being a total torque applied to said wheel, influencing said rotational speed, said total torque being estimated from said rotational speed;
   the propulsion torque transmitted by the user being deduced from said total torque.

2. The method as claimed in claim 1, wherein the torque applied by said motor is slaved to a reference representative of a value of the propulsion torque transmitted by the user.

3. A device for electrically assisting with propulsion able to equip a rolling system comprising at least one driving wheel, wherein said device comprises at least:
   an electric motor able to be fixed to said driving wheel to drive the rotation thereof;
   a sensor able to measure a rotational speed of said driving wheel;
   processing means:
      receiving as input the measurement of said rotational speed;
      storing in memory an unknown input model representing a weighted system, which is a function of a geometry and of a mass of said weighted system, and having as output data said rotational speed, the unknown input being a total torque applied to said wheel, influencing said rotational speed;
      transmitting as output a control reference commanding a motor torque to be applied to said wheel, said control reference being representative of a value of a propulsion torque transmitted by at least one user to said wheel,
   said processing means estimating said total torque by estimating the unknown input representing said total torque from said rotational speed, the propulsion torque applied by the user being deduced from said total torque.

4. The device as claimed in claim 3, wherein with the motor being of a brushless type, said sensor is integrated into the motor, the rotational speed of said at least one driving wheel being measured from a rotor speed of said motor.

5. The device as claimed in claim 3, wherein the motor torque is slaved to said control reference.

6. An electric wheelchair, comprising a device as claimed in claim 3, said chair comprising two driving wheels, an electric motor being fixed to each wheel in order to drive the rotation thereof, and for each driving wheel, the processing means:
   receiving as input a measurement of the rotational speed of said wheel;
   storing in memory a model considering an unknown input representing said weighted chair, which is a function of the geometry and of the mass of said weighted chair, and having as output data the rotational speed of said wheel, the unknown input being the total torque applied to said wheel, influencing said rotational speed;
   transmitting as output the control reference commanding the motor torque to be applied to said wheel, said reference being representative of the value of the propulsion torque transmitted by at least one user to said wheel,
   said processing means estimating said total torque by estimating the unknown input representing said total torque from said rotational speed, the propulsion torque applied by the user being deduced from the total torque.

7. The electric wheelchair as claimed in claim 6, wherein the processing means are installed on a control board, fixed to a chassis of said chair, a two-way link connecting said control board to each motor in order to transmit said control reference to each motor and to receive said rotational speed measurement.

8. The electric wheelchair as claimed in claim 6, wherein, for each wheel, the propulsion torque is transmitted via a hand rim coupled to the wheel.

9. The electric wheelchair as claimed in claim 6, wherein, for each wheel, the propulsion torque is transmitted by a third party pushing said chair.

10. A kit for electrically assisting with a propulsion of a wheelchair comprising two driving wheels, comprising at least:
    two electric motors, each motor being able to be fixed to a driving wheel to drive the rotation thereof;
    two sensors, each one being able to measure a rotational speed of one driving wheel;
    for each driving wheel, processing means:
       receiving as input the measurement of its rotational speed;
       storing in memory an unknown input model representing a weighted chair, which is a function of a geometry and of a mass of said weighted chair, and having as output data the rotational speed of said wheel, the unknown input being a total torque applied to said wheel, influencing said rotational speed;
       transmitting as output a control reference commanding a motor torque to be applied to said wheel, said reference being representative of a value of a propulsion torque transmitted by at least one user to said wheel,
    said processing means estimating said total torque by estimating the unknown input representing said total torque from said rotational speed, the propulsion torque applied by the user being deduced from said total torque.

11. The kit as claimed in claim 10, wherein with said motors being of a brushless type, each sensor is integrated into one of said motors, the rotational speed of a wheel being measured from a rotor speed of the motor.

12. The kit as claimed in claim 10, wherein the processing means are installed on one or more control boards, able to be fixed to a chassis of said chair, a two-way link connecting said one or more control boards to each motor in order to transmit said reference to each motor and to receive said rotational speed measurement.

13. The kit as claimed in claim 10, wherein, for each wheel, the propulsion torque is transmitted via a hand rim coupled to the wheel.

14. The kit as claimed in claim 10, wherein, for each wheel, the propulsion torque is transmitted by a third party pushing said chair.

* * * * *